Feb. 13, 1962 W. L. JUBELT 3,020,644
GEAR GAUGING APPARATUS
Filed March 9, 1959
FIG.1.
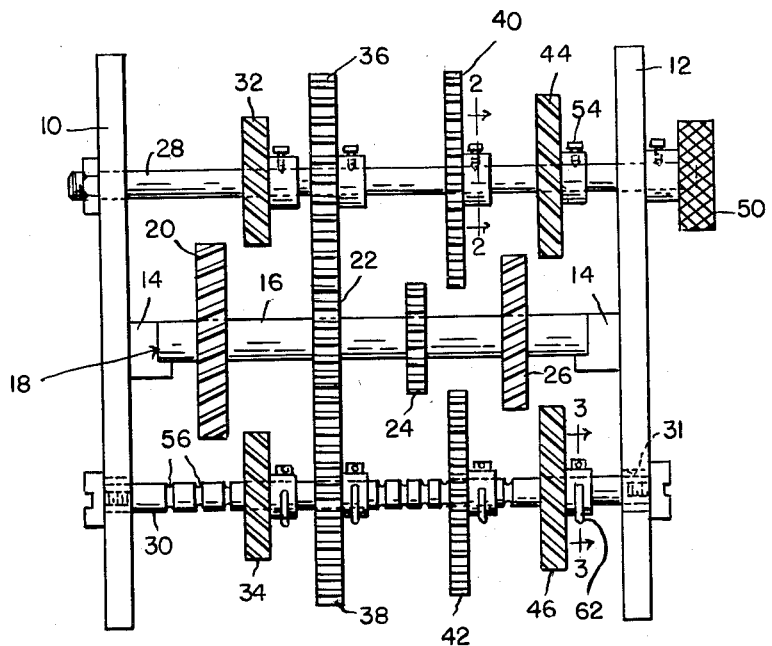
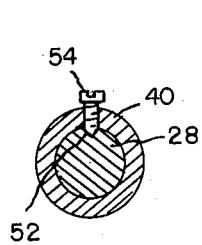
FIG.2.
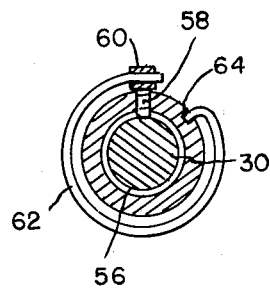
FIG.3.
INVENTOR.
WARREN L. JUBELT
BY
ATTORNEYS United States Patent Office 3,020,644
Patented Feb. 13, 1962

3,020,644
GEAR GAUGING APPARATUS
Warren L. Jubelt, East Detroit, Mich., assignor to National Broach & Machine Company, Detroit, Mich., a corporation of Michigan
Filed Mar. 9, 1959, Ser. No. 798,075
3 Claims. (Cl. 33—179.5)

The present invention relates to gear gauging apparatus, and more particularly to a gear gauge adapted to prevent passage of an oversized gear into a gear finishing machine.

It is an object of the present invention to provide adjustable gear gauging apparatus for use in size gauging any one of a plurality of gears on a cluster gear.

It is a feature of the present invention to provide gear gauging apparatus for cluster gears comprising two parallel shafts, a pair of gauge gears for each of the gears of a cluster gear, one gauge gear of each pair being carried by one of said parallel shafts, and means for locating said gauge gears axially of said parallel shafts to selectively position each pair for cooperation with one of the gears of said cluster gear while the remaining pairs of gears are in clearance position.

Other objects and features of the invention will become apparent as the description proceeds, especially when taken in conjunction with the accompanying drawings, illustrating a preferred embodiment of the invention, wherein:

FIGURE 1 is an elevational view of a gauge constructed in accordance with the present invention.

FIGURE 2 is a fragmentary enlarged sectional view on the line 2—2, FIGURE 1.

FIGURE 3 is a fragmentary enlarged sectional view on the line 3—3, FIGURE 1.

Referring now to the figures the gauge comprises a pair of vertically extending laterally spaced support plates 10 and 12 provided with guide rails 14 on which the ends of the shaft 16 of a cluster gear 18 are movable. The cluster gear 18 is provided with gears 20, 22, 24 and 26 integral therewith. The gauge is intended for association with a gear finishing machine such for example as a gear shaver. In many cases it is desirable to finish all of a plurality of gears on a single cluster gear in a succession of operations. The gear finishing machine must be capable of taking care of five variables: (1) the shaving tool, (2) the tool and work center distance, (3) head and tailstock axial positioning, (4) axial positioning of an automatic loader if used, and (5) size gauging of the particular gear of the cluster to be finished.

The cutter changes, center distance adjustments, and axial positioning of the machine head and tailstocks, and the loader are simply and easily accomplished. The provision of the quick change size gauging device disclosed herein takes care of the fifth requirement.

Specifically, the gauge comprises a first shaft 28 rotatably mounted between the plates 10 and 12, and a second shaft 30 which may be adjustably fixed between the plates in slots 31 and which extends parallel to the shaft 28. The shafts 28 and 30 are located to be equidistant from the shaft 16 of a cluster gear 18 supported on the rails 14.

A pair of gauge gears is provided for gauging each of the gears of the cluster gear. Gauge gears 32 and 34 are designed to be associated with the gear 20. Gauge gears 36 and 38 are designed to be associated with the gear 22. Gauge gears 40 and 42 are designed to be associated with the gear 24. Gauge gears 44 and 46 are designed to be associated with the gear 26. One of each of the pair of gears is mounted on one of the shafts 28 or 30. Thus, gauge gears 32, 36, 40 and 44 are carried by the shaft 28, and gauge gears 34, 38, 42 and 46 are carried by the shaft 30. Means are provided for positioning each pair of gauge gears so that it may gauge the corresponding gear on the cluster gear, or be in clearance with respect to the entire cluster gear. Thus for example, when the gauge is set up on a machine adapted to finish the gear 22, the pair of gears 36 and 38 is moved to the positions on their respective shafts 28 and 30 in which they mesh with the gear 22. The remaining pairs of gears; namely, gears 32, 34, gears 40, 42, and gears 44, 46, are moved to positions on their respective shafts in which they are in clearance with respect to the entire cluster gear.

The gauge or master gears 32, 36, 40 and 44 are provided with means adapted to locate and retain them in a required position axially of the shaft 28 and at the same time to fix them to the shaft for rotation therewith. The shaft 28 is rotatable and is provided with a knurled knob 50 by means of which the shaft 28 and the gauge gears 32, 36, 40 and 44 may be rotated as a unit. The means for fixing the gears 32, 36, 40 and 44 to the shaft both with respect to axial position and against rotation, is illustrated in FIGURE 2 where it will be observed that the shaft 28 is provided with a conical recess 52 adapted to receive the cone nose of a set screw 54.

The gauge gears 34, 38, 42 and 46 are provided with means adapted to locate them in desired position axially of the shaft 30, but the gears may have relative rotation to the shaft. Accordingly, a construction is provided which makes it simpler to position the gauge gears 34, 38, 42 and 46 on the shaft 30. This means comprises annular grooves or channels 56 on the shaft 30 and spring pressed detents 58 extending through hubs on the gears 34, 38, 42 and 46. The detents 58 include head portions 60 having openings through which the end of a coil spring 62 is extended, as best seen in FIGURE 3. The opposite end of the spring 62 is conveniently received in a radial recess 64 provided in the hub of the gauge gear.

The spring pressed detents 58 may be moved to release position simply by force applied to the respective gears axially of the shaft, and are readily rotatable on the shaft when located in position to mesh with one of the gears of the cluster gears.

In operation, a pair of gauge gears such as the gears 36 and 38, are brought into aligned position on their respective shafts 28 and 30 and in alignment with the gear 22 of the cluster gear. At this time the set screw 54 of the gear 36 is tightened to cause its conical nose portion to enter into the appropriate recess 52 in the shaft 28. The remaining gears 30, 32, 40 and 44 on the shaft 28 are moved to positions of clearance and their set screws are tightened to retain them in this position. Similarly, gears 34, 42 and 46 are moved laterally with respect to their associated gears 20, 24 and 26 while they are retained by cooperation between the spring pressed detents 58 and the associated annular grooves or channels 56.

With the parts in the relationship described a cluster gear is introduced into the gauge with its shaft ends located on the rails 14 and moved along the rails until the gear 22 thereon engages the gauge gears 36 and 38. At this time the gear 36 is turned by turning the knob 50 in a direction to cause the cluster gear and particularly the gear 22 of the clutch gear to move through the space between the pair of gauge gears 36, 38. If the gear 22 is over-size or at least sufficiently over-size to injure the gear finishing machine, it cannot pass through the space between the pairs of gauge gears.

When the machine is adjusted to effect a gear finishing operation on another of the gears of the cluster gear, the pair of gauge gears associated with the said other gear of the cluster gear is brought into position and locked up, while the remaining gauge gears are moved to clearance position.

The foregoing construction provides a simple gauge means for cluster gears which may be quickly and easily changed over to effect a gauging operation of a selected one of a plurality of gears on a cluster gear.

The drawings and the foregoing specification constitute a description of the improved gear gauging apparatus in such full, clear, concise and exact terms as to enable any person skilled in the art to practice the invention, the scope of which is indicated by the appended claims.

What I claim as my invention is:

1. An in-gauge for cluster gear members having integral first and second gears on a single shaft, said gauge comprising laterally spaced supports, a pair of parallel shafts extending between said supports, first and second pairs of gauge gears, one gauge gear of each pair being adjustably carried by one of said parallel shafts, each pair of gauge gears when brought into lateral registration being dimensioned to fit in tight mesh with one of the gears of said cluster gear, means for locking said gauge gears in different positions of axial adjustment on said parallel shafts to locate either pair in position to gauge one of the gears of said cluster gear and the other pair in clearance with respect to said cluster gear, one of said parallel shafts being rotatable, manual means for rotating said one shaft, and means for fixing at least the gear positioned to gauge the gear of the cluster gear to said one parallel shaft for rotation therewith.

2. A gauge as defined in claim 1 in which the means for locking the gauge gears in different positions of axial adjustment and the means for fixing the gauge gears to the said one parallel shaft for rotation therewith comprise radial screws carried by said gauge gears and screw-receiving recesses in the said one parallel shaft.

3. A gauge as defined in claim 2 in which the other of said parallel shafts is provided with a plurality of annular grooves, and the gauge gears on said other parallel shaft include spring pressed detents received in one of said grooves to prevent movement thereof axially of said other parallel shaft.

References Cited in the file of this patent

UNITED STATES PATENTS

| | | |
|---|---|---|
| 1,282,030 | Benemelis | Oct. 22, 1918 |
| 2,178,293 | Wogeck | Oct. 31, 1939 |
| 2,309,809 | Vane | Feb. 2, 1943 |
| 2,726,456 | Pergande | Dec. 13, 1955 |

FOREIGN PATENTS

| | | |
|---|---|---|
| 382,495 | England | Oct. 27, 1932 |